United States Patent
Xu

(10) Patent No.: US 11,885,880 B2
(45) Date of Patent: Jan. 30, 2024

(54) UNWRAPPED PHASES FOR TIME-OF-FLIGHT MODULATION LIGHT

(71) Applicant: Microsoft Technology Licensing, LLC, Redmond, WA (US)

(72) Inventor: Zhanping Xu, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1067 days.

(21) Appl. No.: 16/528,472

(22) Filed: Jul. 31, 2019

(65) Prior Publication Data
US 2021/0033731 A1    Feb. 4, 2021

(51) Int. Cl.
| | |
|---|---|
| G06V 10/143 | (2022.01) |
| G01S 17/36 | (2006.01) |
| H04N 13/254 | (2018.01) |
| G01S 7/4915 | (2020.01) |
| G01S 17/89 | (2020.01) |
| G06T 7/50 | (2017.01) |
| G06V 10/141 | (2022.01) |

(52) U.S. Cl.
CPC ............ *G01S 17/36* (2013.01); *G01S 7/4915* (2013.01); *G01S 17/89* (2013.01); *G06T 7/50* (2017.01); *G06V 10/141* (2022.01); *G06V 10/143* (2022.01); *H04N 13/254* (2018.05); *G06T 2207/10028* (2013.01)

(58) Field of Classification Search
CPC ........ G01S 17/36; G01S 7/4915; G01S 17/89; G01S 7/4914; G01S 17/32; G01S 17/894; G06T 7/50; G06T 2207/10028; G06V 10/141; G06V 10/143; H04N 13/254
See application file for complete search history.

(56) References Cited

U.S. PATENT DOCUMENTS

| | | | |
|---|---|---|---|
| 8,587,771 B2 | 11/2013 | Xu et al. | |
| 9,702,976 B2 | 7/2017 | Xu et al. | |
| 2014/0049767 A1* | 2/2014 | Benedetti | G01S 17/894 356/5.1 |
| 2016/0116594 A1 | 4/2016 | Xu et al. | |
| 2018/0011195 A1 | 1/2018 | Perry et al. | |
| 2022/0078342 A1* | 3/2022 | Whyte | G01S 7/497 |

OTHER PUBLICATIONS

Kadambi, Achuta, Jamie Schiel, and Ramesh Raskar. "Macroscopic interferometry: Rethinking depth estimation with frequency-domain time-of-flight." Proceedings of the IEEE Conference on Computer Vision and Pattern Recognition. 2016. (Year: 2016).*

(Continued)

*Primary Examiner* — Amandeep Saini
*Assistant Examiner* — Denise G Alfonso
(74) *Attorney, Agent, or Firm* — Alleman Hall Creasman & Tuttle LLP

(57) ABSTRACT

Adaptive phase unwrapping for a time-of-flight camera. A scene is illuminated with modulation light having two or more frequencies that do not have a common integer denominator. The modulation light that is reflected off objects within the scene is received at a sensor array. The received modulation light is then processed and weighted in the complex domain to determine unwrapped phases for each of the two or more frequencies of modulation light.

18 Claims, 13 Drawing Sheets

(56) References Cited

OTHER PUBLICATIONS

Wang, Yimin, et al. "Two-dimensional phase unwrapping in Doppler Fourier domain optical coherence tomography." Optics express 24.23 (2016): 26129-26145. (Year: 2016).*

Loffeld, Otmar, et al. "Phase unwrapping for SAR interferometry—A data fusion approach by Kalman filtering." IEEE Transactions on Geoscience and Remote Sensing 46.1 (2007): 47-58. (Year: 2007).*

"International Search Report and Written Opinion Issued in PCT Application No. PCT/US20/036225", dated Sep. 10, 2020, 11 Pages.

"Office Action Issued in European Patent Application No. 20747531.0", dated Oct. 19, 2023, 7 Pages.

* cited by examiner

UNWRAPPED PHASES FOR TIME-OF-FLIGHT MODULATION LIGHT

BACKGROUND

Time-of-flight (ToF) imaging systems may be used to produce a depth image of an environment, with each pixel of the depth image representing a distance to a corresponding point in the environment. The distance to a point on an imaged surface in the environment is determined based on the length of the time interval in which light emitted by the imaging system travels out to that point and then returns back to a sensor array in the imaging system (i.e., the ToF). An optical ToF camera measures this interval for many points on the surface and thereby assembles a depth image in which a depth coordinate for each pixel in the depth image is proportional to the ToF observed at that pixel.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Using a time-of-flight camera, a scene is illuminated with modulation light having two or more frequencies that do not have a common integer denominator. The modulation light that is reflected off objects within the scene is received at a sensor array of the time-of-flight camera. The received modulation light is then processed to determine unwrapped phases for each of the two or more frequencies of modulation light.

DETAILED DESCRIPTION

Optical time-of-flight (ToF) imaging has become the predominant depth-imaging technology, owing to the development of high-speed, high-resolution optical sensor arrays. 'Phase-based' optical ToF imaging is an important variant of this technique, in which depth is computed based on the phase lag of modulated light reflected back from the subject. Devices employing this technique are increasingly found in both industrial and consumer applications, including device automation applications, gaming and virtual reality applications, biometric and facial recognition applications, etc. This disclosure is directed to an improvement to ToF imaging that allows for multi-frequency imaging using modulation light having two or more frequencies that do not have a common integer denominator. In turn, this results in the ability to adjust the frequencies utilized and thus improve depth measurements, improve power consumption, and/or provide other advantages.

Figure 1:
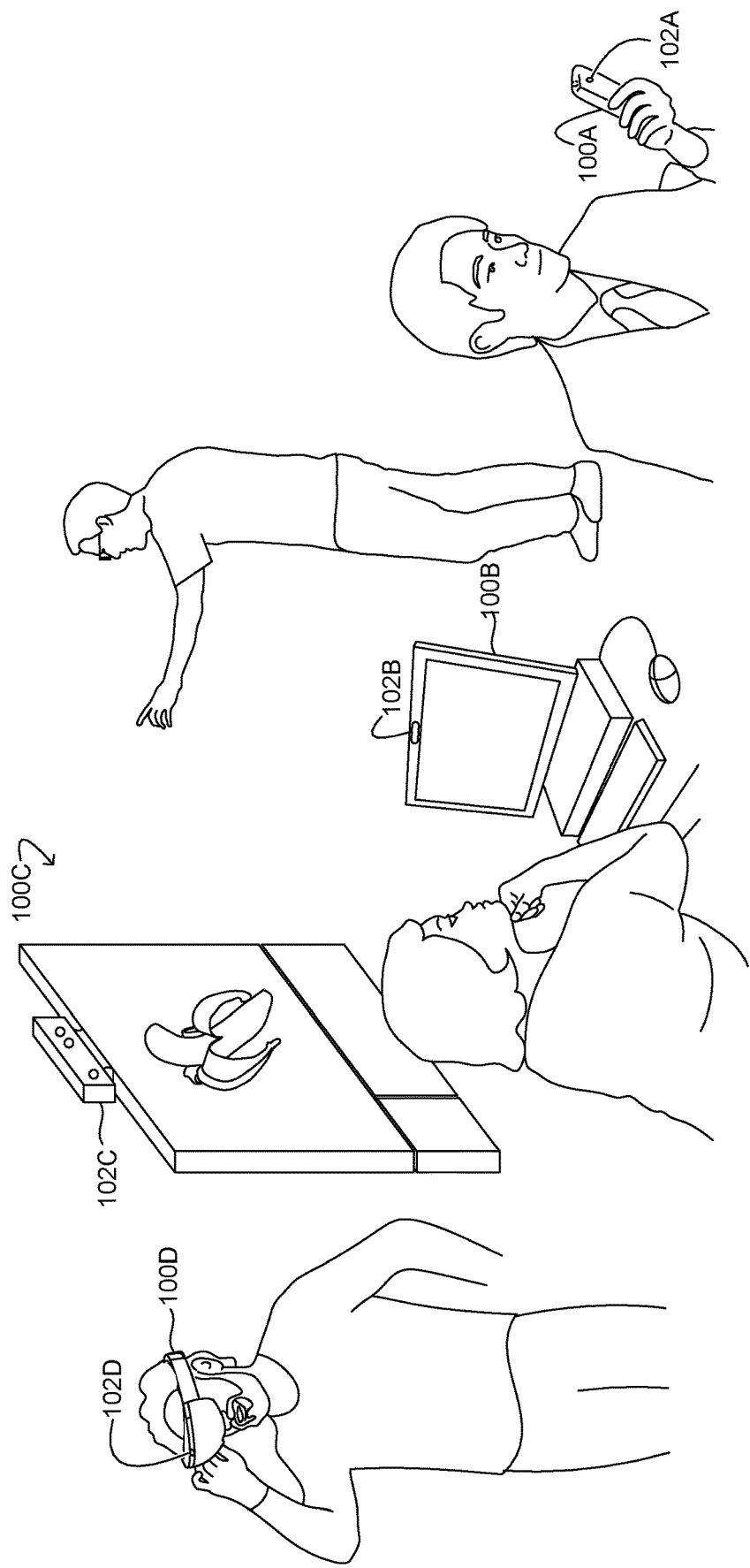
FIG. 1 shows aspects of example electronic devices having embedded or peripheral digital cameras.

FIG. 1 shows aspects of four different examples of electronic devices (100A-D) having embedded or peripheral digital cameras (102A-D). Device 100A is a smartphone that includes a camera 102A. Device 100B is a personal computer that includes a web camera 102B. Device 100C is a video game system that includes a peripheral 3D camera 102C. Device 100D is a virtual-reality headset that includes a 3D camera 102D. The correction methods disclosed herein may be applicable to the output of these and other types of user-facing and/or world-facing digital cameras, in these and other device contexts.

Figure 2:
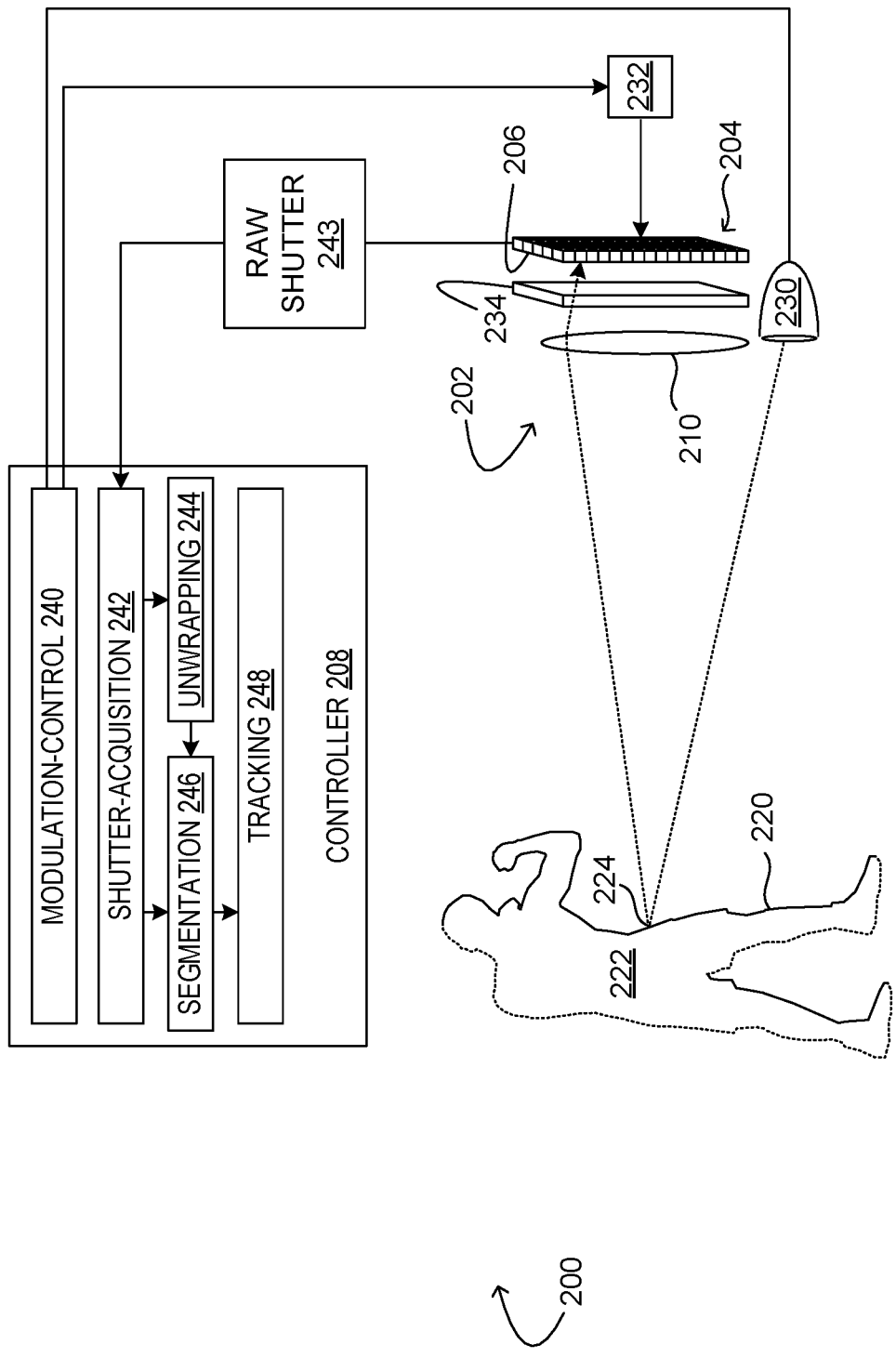
FIG. 2 shows aspects of an example digital camera.

FIG. 2 shows aspects of an example imaging environment 200 including digital camera 202 in one implementation. Digital camera 202 includes a sensor array 204 comprising plural sensor elements 206 (e.g., pixels), a controller 208, and an objective lens system 210. Objective lens system 210 is configured to focus an image of at least one surface 220 of photographic subject 222 onto sensor array 204. Controller 208 is configured to gather and process data from the various sensor elements 206 and thereby construct a digital image of the subject. Controller 208 may be implemented across one or more computing devices, examples of which are discussed herein and with regard to FIG. 7.

Digital images constructed by controller 208 may be represented as a numeric array with a value $S_j$ provided for each of a set of pixels $(X, Y)_j$. The X, Y position of each pixel of the digital image is mapped to an associated sensor element 206 of sensor array 204, and, via objective lens system 210, to a corresponding associated locus 224 of surface 220. In some implementations, the mapping of image pixels to sensor elements may be a 1:1 mapping, but other mappings may be used as well, such as 1:4, 4:1, among others. In some implementations, digital camera 202 may be configured to acquire a time-resolved sequence of digital images of subject 222—i.e., video.

The dimensionality of the $S_j$ value of pixels $(X, Y)_j$ is not particularly limited. In some examples, $S_j$ may be a real- or integer-valued scalar that specifies the brightness of pixel $(X, Y)_j$. In other examples, $S_j$ may be a vector of real or integer values that specifies the color of pixel $(X, Y)_j$—e.g., using scalar component values for the red, green, and blue color channels. In still other examples, $S_j$ may be preprocessed to include a complex value $a+b\sqrt{-1}$, where a and b are integers or real numbers. As described in greater detail below, a complex value $S_j$ may be used to represent the signal response of the sensor elements of an optical ToF camera that employs continuous-wave (CW) modulation and phase discrimination to resolve radial distance. Such a camera is referred to herein as a 'CW-ToF camera'.

Digital camera 202 of FIG. 2 is a CW-ToF camera configured to resolve radial distance Z to a plurality of points j on surface 220 of photographic subject 222. To enact phase-based ToF imaging, CW-ToF camera 202 includes a modulated light emitter 230 and a sensor array 204 with an analog and/or digitally modulated electronic shutter 232. Modulated light emitter 230 may be configured to emit electromagnetic radiation having any frequency detectable by sensor elements 206. Modulated light emitter 230 may be an infrared and/or near-infrared light-emitting diode (LED) or laser diode (LD), for example, and the sensor array may be a high-resolution array of complementary metal-oxide semiconductor (CMOS) sensor elements 206. Set behind an objective lens system 210 and a wavelength filter 234 that may be an off-sensor optical component or positioned on a filter layer directly on sensor 204, the sensor array is configured to image light from modulated light emitter 230 that reflects off surface 220 and back to the camera. Other optical ToF cameras may include different optical, light-emitter and/or sensor-array variants—e.g., a charge-coupled device (CCD) sensor array or a microlens objective array.

Electronic shutter 232 may refer to a controlled voltage signal, including any suitable modulation waveform, with a regulatory bias optionally applied concurrently to certain electrode structures of the various sensor elements 206 of sensor array 204. In some examples, the electrode structures receiving the controlled voltage signal with a bias may include current collectors that, depending on the level of the biased voltage signal, cause photoelectrons created within sensor elements 206 to drift to the current collectors and be measured as current or as voltage via a current to voltage convertor. In some examples, the electrode structures receiving the controlled biased voltage signal may include gates that, depending on the level of the biased voltage signal, encourage the photoelectrons to drift towards the current collectors or current to voltage convertors.

Controller 208 of CW-ToF camera 202 includes a modulation-control engine 240 configured to modulate light emitter 230 and synchronously modulate electronic shutter 232 of sensor array 204. In some examples, light emitter 230 and electronic shutter 232 are modulated at one or more predetermined frequencies, with a predetermined, angular phase offset φ' controlling the retardance of the electronic-shutter modulation relative to the light-emitter modulation. In some examples, 'modulation', as used herein, refers to a sinusoidal or digitized quasisinusoidal waveform, and/or a basic harmonic of a rectangular waveform, which simplifies analysis. This feature is not strictly necessary, however, as modulation by other waveforms may be used instead.

In some implementations, sensor array 204 images the component of the reflected light that lags the emitter modulation by each of a series of predetermined phase offsets φ'. Shutter-acquisition engine 242 of controller 208 is configured to interrogate sensor array 204 to retrieve a resulting signal value $S_j$ from each sensor element 206. One digital image captured in this manner is called a 'raw shutter.' A raw shutter 243 may be represented as a numeric array with a φ'-specific real intensity value $S_j$ provided for each sensor element 206 and associated with coordinates $(X, Y)_j$ that specify the position of that particular sensor element 206 in sensor array 204. By capturing three or more consecutive raw shutters 243 with three or more different phase offsets φ', it is possible to construct a 'phase image' that reveals the actual phase lag p of the light reflected back to each sensor element 206. A phase image is a numeric array with $\varphi_j$ specified for each sensor element j and associated with coordinates $(X, Y)_j$ that specify the position of that particular sensor element 206 in sensor array 204. In some implementations with signal preprocessing, each signal value $S_j$ is a complex number $a+b\sqrt{-1}$, where a is the signal component in phase with the emitter modulation, and b is the signal component that lags the emitter modulation by 90°. In this context, a complex signal value $S_j$ is related to modulus $\|S_j\|$ and phase lag φ by $$S_j = \|S_j\| e^{-i\varphi} \quad (Eq.1).$$

In implementations in which the phase-independent reflectance of the subject is also of interest, a given phase image may be processed by replacing each complex signal value $S_j$ by its modulus, or by the square of its modulus. An image of that kind is referred to herein as an 'active-brightness' image.

Using data from a single phase image or set of component raw shutters, it is possible to conditionally estimate the radial distance $Z_j$ between the depth camera and the surface point imaged at each sensor element j. More particularly, it is possible to solve for the depth using $$(\varphi/4\pi)+(N/2)=(Z_j f/c), \quad (Eq. 2),$$

where c is the velocity of light, f is the modulation frequency, and N is a non-negative integer.

The solution above is unique when the entire range of depth values $Z_j$ is no larger than half of the distance traveled by light in one modulation period, c/(2f), in which case N is a constant. Otherwise, the solution is underdetermined and periodic. In particular, surface points at depths that differ by any integer multiple of c/(2 f) are observed at the same phase lag (p. Depth-image data resolved only to that degree—e.g., data from a single phase image or corresponding triad of raw shutters—is said to be 'aliased' or 'wrapped'.

In order to resolve depth in ranges larger than c/(2f), it is possible to compute additional phase images using raw shutters acquired at different modulation frequencies. In some examples three, four, five, or more frequencies may be used; in other examples two frequencies are sufficient. The combined input from all of the raw shutters (e.g., nine in the case of three frequencies, six in the case of two) is sufficient to uniquely determine each $Z_j$. Redundant depth-imaging of the same subject and image frame to provide a non-periodic depth estimate is called 'de-aliasing' or 'unwrapping'; this function is enacted in unwrapping engine 244 of controller 208. An unwrapped depth image, or 'radial-distance map' may be represented as a numeric array with a radial distance value $Z_j$ provided for each pixel and associated with coordinates $(X, Y)_j$ that specify the pixel position. As an example, modulation-control engine 240 may simultaneously output a modulation signal to a phase shifter. The phase shift steps (>=3) may be set at equal distances within $2\pi$ for each modulation frequency $f_m$. The phase shifting rf-signal may then be used to demodulate the signal at each pixel.

In some implementations, the pixels of an unwrapped depth image may be classified into one or more segments according to a single-tier or multi-tier (i.e., hierarchical) classification scheme. Segmentation engine 246 of controller 208 may be configured to enact the classification. In some examples, pixels may be classified as foreground or background. In some examples pixels classified as foreground may be further classified as a human subject. In some examples, pixels classified as a human subject may be further classified as a 'subject head', 'subject hand', etc. A classified digital image may be represented as a numeric array with a signal value S and class value $C_j$ provided for each pixel and associated with coordinates $(X, Y)_j$ that specify the pixel position.

Optionally, in video implementations, model fitting may be applied to track the motion of the classified depth-image segments from frame to frame. In examples in which the depth-imaging subject includes a human being, classified depth-image segments corresponding to the hands may be segmented from the rest of the subject. In depth-video applications, the hand segments can then be tracked through the sequence of depth-image frames and/or fit to a kinematic model. Tracked hand segments can be used as input for virtual-reality video games or as gesture input for controlling a computer, for example. Tracking may be enacted in tracking engine 248 of controller 208. Naturally, the approach herein extends to various other segmentation and tracking tasks that may be performed on the output of a phase-based CW-ToF camera.

Using a single higher radio frequency may increase depth resolution but does so with limited non-ambiguity (e.g., 0.75 m at 200 MHz). As such, multiple higher radio frequencies are usually applied to extend the measurement distance following a phase unwrapping technique. Multiple depth maps of the same environment may be captured using different modulation frequencies of emitted light, improving accuracy for environments with varying reflectivity and/or partially occluded objects.

Current existing unwrapping techniques are performed in the phase domain (phase vector domain). This may result in a number of limitations. For example, the values of the multiple frequencies are constrained to have an integral relationship with a common denominator among the frequencies, (e.g., [153, 162, 198]/9=[17 18 22]) in order to provide a repeatable phase cycle where all of the frequencies overlap periodically at known distances. Typically, the base frequency is relatively low, setting the unwrapping distance, and the applied frequency is relatively high. Without a common integer, the frequencies will still meet, but that could occur at infinity or some other irrational number.

This allows for less flexibility to build an economical, adaptable ToF camera system, as the array of potential frequency configurations are restricted to common, related values. As such, many frequency configurations that would improve power efficiency may not be usable. As the number of frequencies increases, the phase domain unwrapping process generates an increased computational burden. For example, in methods applying look-up tables, the size and parameters of the look-up tables will change whenever the frequency number and configuration changes. Further, the system robustness may not be automatically adaptable, since the phase domains of the differing frequencies may have different phase noise sizes.

Example systems and methods are presented in this disclosure for phase unwrapping in the complex domain wherein vector phase unwrapping is converted into a scalar phase unwrapping process. Such an approach allows a 3D ToF camera to use any optimized set of frequencies without being constrained by common integer denominators, thus enabling adaptive systemic power efficiency. The computational power needed to perform unwrapping of scalars is less than phase vector-based methods for an equal or even higher number of frequencies used. The scalar unwrapping method in the complex domain may be weighted based on active brightness, therefore generating a system that is auto adaptive, as the system ages or unbalanced phase noise is encountered at each frequency. Such unwrapping methods may use the same generic formulation to handle any number of frequencies as well as any type of frequency combinations, allowing for adaptive, user friendly ToF cameras which may self-optimize for a given imaging environment. While this disclosure focuses on modulated light based amplitude continuous wave applications, such as infrared imaging, the technology disclosed herein may also be applicable to radar and other distance measurement techniques that rely upon phase detection of waveforms at different frequencies in order to determine distance.

Figure 3:
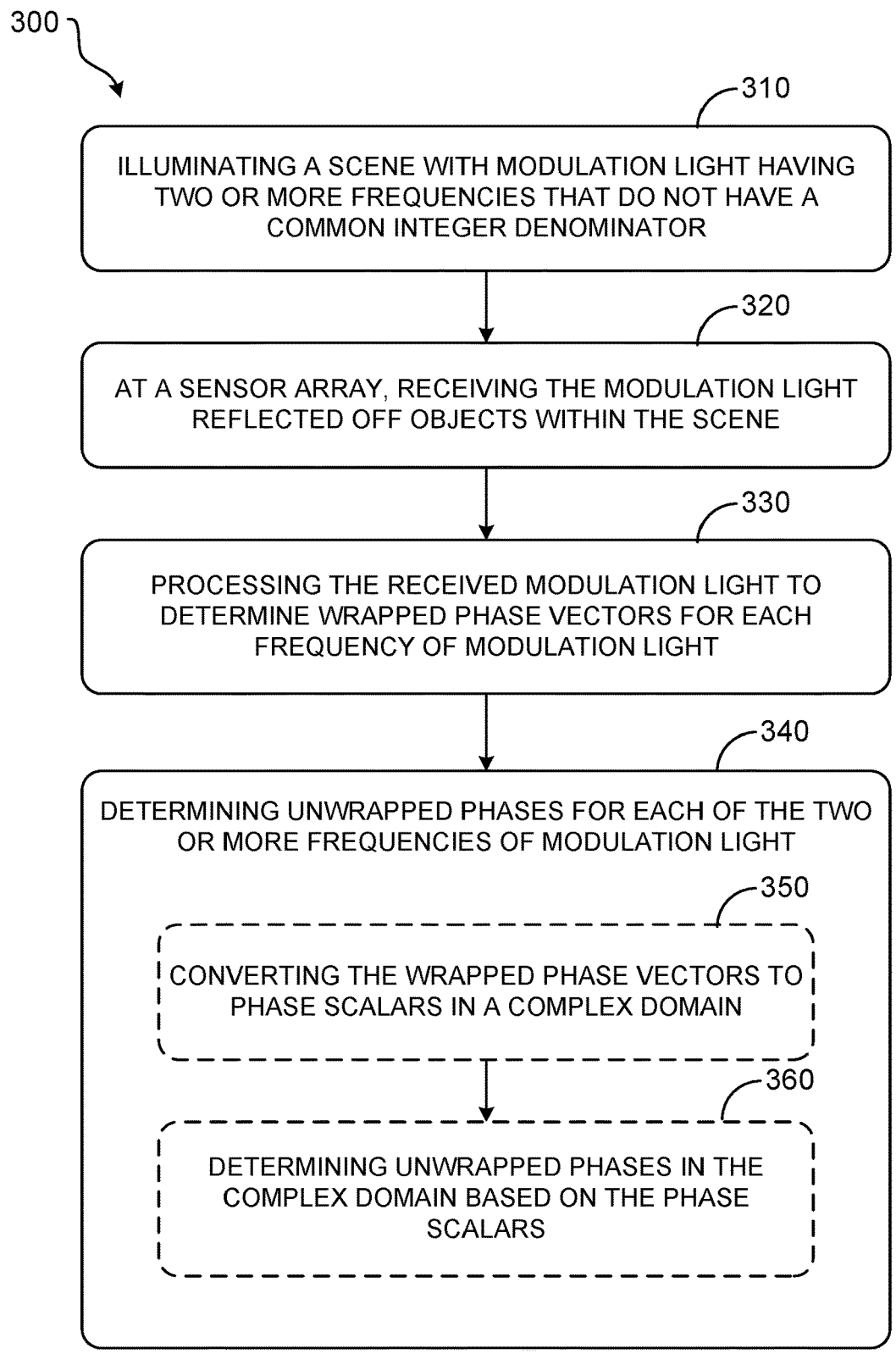
FIG. 3 shows an example method for determining unwrapped phases via a time-of-flight camera.

FIG. 3 shows a flow-chart for an example method 300 for phase unwrapping using a time-of-flight camera, such as digital camera 202. At 310, method 300 includes illuminating a scene with modulation light (e.g., infrared light) having two or more frequencies that do not have a common integer denominator. The set of two or more frequencies may include integer frequencies and/or fractional frequencies. For example, a modulation controller, such as modulation controller 240 may be configured to generate radio-frequency modulation signals. A modulated light emitter, such as modulated light emitter 230 may be configured to receive radio-frequency modulation signals from the modulation controller and to illuminate a scene with modulation light. As nonlimiting examples, sets of example frequencies (in MHz) may include {151, 167, 197}, {160.123, 168.456, 198.789}, {96.9, 102, 114, 141.3, 2016}, and {149, 168, 211, 225, 148}.

At 320, method 300 includes, at a sensor array, receiving the modulation light reflected off objects within the scene. The sensor array may include a plurality of sensor elements, subsets of which are tuned and/or filtered to receive infrared light at one or more of the emitted frequencies, as described for sensor array 204.

At 330, method 300 includes processing the received infrared light to determine wrapped phase vectors for each frequency of modulation light. For example, for each frequency of modulation light received at the sensor array, the resultant capture signal can be expressed as:

$$V_{m,k} = CM_m + AB_m \cdot \cos(\varphi_{d,m} + \psi_k) \text{ for } k=1,2,\ldots N_k \text{ and } m=1, 2, \ldots N_m \quad \text{(Eq. 3)}$$

Wherein m is a number of frequencies, and wherein $V_{m,k}$ represents the sensor voltage output (e.g., capture signal) at a modulation frequency $f_m$ for m>=2. The capture intensity may be 2 dimensional and have an index (i,j) corresponding to location and distance. $CM_m$ is a common mode of the capture at modulation frequency $f_m$, representing a DC component of the signal. $AB_m$ is an active brightness at modulation frequency $f_m$, which is related to the phase signal and contributed by the active light emitted from the modulated light emitter. This allows for differences in illumination power across frequencies to be accounted for in downstream equations. $\varphi_{d,m} = 2\pi f_m t_d$ and represents the time-of-flight corresponding phase at modulation frequency $f_m \cdot \psi_k$ represents the equally distanced phase shift steps within $2\pi$ module for k>=3. The phase shift steps may be the same at each frequency condition. $N_k$ represents the total number of phase shifting steps at each frequency, with the assumption that they are the same at each frequency. $N_m$ represents the total number of frequencies output by the modulated light emitter.

While Eq. 3 does not include high orders of harmonics, it may be applied to unwrapping the captured phase vectors. Eq. 3 may be converted to a normal equation and its accompanying derivations:

$$E = \Sigma_{m,k} [V_{m,k} - CM_m - AB_m \cos(2\pi f_m t_d + \psi_k)]^2 \quad \text{(Eq. 4)}$$

$$\frac{\partial E}{\partial CM_m} = 0 \quad \text{(Eq. 4a)}$$

$$\frac{\partial E}{\partial t_d} = 0 \qquad \text{(Eq. 4b)}$$

$$\frac{\partial E}{\partial AB_m} = 0. \qquad \text{(Eq. 4c)}$$

The normal equation applies a least-squares method that effectively filters Gaussian noise from the phase vectors using a numeric filter in the complex domain. By including active brightness, amplitude modulation across the different frequencies may be accounted for. When amplitude is low, phase error tends to be large, containing more phase noise. Accounting for active brightness allows for weighting of the different frequencies to reduce the error contributed to the entire system. Phase unwrapping thus becomes robust when phase error is unbalanced.

For example, the three system variables may be derived based on solving Equations 4a, 4b, and 4c for each specific frequency $f_n$:

$$CM_m = 1/N_k \Sigma_k (V_{m,k}); \qquad \text{(Eq. 5a)}$$

$$\varphi_{d,m} = 2\pi f_m t_{dn} = \arctan\left(\frac{-I(m)}{R(m)}\right); \qquad \text{Eq. 5b}$$

$$AB_m = 2/N_k \sqrt{I(m)^2 + R(m)^2}, . \qquad \text{Eq. 5c}$$

Wherein $I(m) = \Sigma_k [V_{m,k} \sin(\psi_k)]$, and represents the imaginary part of a complex value; $R(m) = \Sigma_k [V_{m,k} \cos(\psi_k)]$, and represents the real part of a complex value; $\varphi_{d,m} = 2\pi f_m t_{dm}$, and represents the wrapped phase in a $2\pi T$ module following the arctan operation expressed in Eq.5b; and $t_{dm}$ represents a wrapped time-of-flight at each frequency $f_m$.

At 340, method 300 includes determining unwrapped phases for each of the two or more frequencies of modulation light. As used herein, an unwrapped phase represents a phase lag corresponding to time-of-flight of modulation light. Previously-used methods of phase unwrapping are accomplished via processing the phase vector set $\{\varphi_{d,m}\}$ to find the true time-of-flight. However, as described above, these methods are inflexible to frequency selection, and are increasingly computationally expensive as the number of frequencies utilized increases. As such, optimization of frequency sets using previously-used methods is challenging, resulting in non-optimal camera operation, which may be power-inefficient.

As such, optionally, at 350, method 300 includes converting the wrapped phase vectors to phase scalars in a complex domain. For example, by further solving Eq. 5c with all frequencies of $f_m$ together, an unwrapping formulation may be generated that is constrained by the complex value R(m) and I(m), unitarily in the complex domain:

$$U_M = \Sigma_m \left[ R(m) \cdot \cos(2\pi f_m T_d) - I(m) \cdot \sin(2\pi f_m T_d) - \frac{N_k}{2} AB_m \right] = 0 \qquad \text{(Eq. 6)}$$

Wherein $T_d$ represents the unwrapped time-of-flight related to one single specific frequency $f_{m0}$, for example, the highest frequency. Considering this value together with the wrapped time-of-flight $t_{dm0}$ given in Eq.5b, yields the relationship:

$2\pi f_{m0} T_d = 2\pi M + 2\pi f_{m0} t_{dm0}$ for $M = 0, 1, 2 \ldots M_{max}$ (Eq. 6a). Substituting the relationship of Eq. 6a into Eq.6 yields:

$$U_M = \Sigma_m \left[ R(m) \cdot \cos\left(2\pi f_m \left(\frac{M}{f_{m0}} + t_{d,m0}\right)\right) - I(m) \cdot \sin\left(2\pi f_m \left(\frac{M}{f_{m0}} + t_{d,m0}\right)\right) - \frac{N_k}{2} AB_m \right] = 0 \qquad \text{(Eq. 7)}$$

Wherein M is the wrapped period number of 2T module at frequency $f_{m0}$. From the derivation condition of Eq.4c it may be inferred that if the integer M makes function $U_M$ of Eq.7 reach an extremum (e.g., a minimum value), then the M value is the repeating number $2\pi$, and thus it the unwrapping process can be assumed to be resolving. This formulation yields phase scalars that are expressed with a single unknown integer (M) constrained in the complex domain, thus converting the vector phase unwrapping process into a scalar phase unwrapping process.

Thus, optionally, at 360, method 300 includes determining unwrapped phases in the complex domain based on the phase scalars. As an example, a value for M may be determined based on a value that minimizes the value of $U_M$, such that $0 \leq M \leq M_{max}$. For example, Eq. 7 may be rewritten using Eq. 5b and Eq. 5c:

$$U_M = \Sigma_m \frac{N_k}{2} \left[ AB_m \cdot \left[ \cos\left(2\pi f_m \left(\frac{M}{f_{m0}} + t_{d,m0} - t_{d,m}\right)\right) - 1 \right] \right] = 0. \qquad \text{(Eq. 8a)}$$

Eq. 8a may be considered equivalent to Eq.6 and Eq.7. The constant $$\frac{N_k}{2}$$

may be dropped off, but is kept here for completion. For the condition where $f_m = f_{m0}$, the unwrapped phase expression 2

$$2\pi f_m \left(\frac{M}{f_{m0}} + t_{d,m0} - t_{d,m}\right) = 2\pi M,$$

one term having the frequency $f_{m0}$ is redundant and can be eliminated, yielding:

$$U_M = \Sigma_{\substack{m-1 \\ m \neq m0}} \frac{N_k}{2} \left[ AB_m \cdot \left[ \cos\left(2\pi f_m \left(\frac{M}{f_{m0}} + t_{d,m0} - t_{d,m}\right)\right) - 1 \right] \right] = 0. \qquad \text{(Eq. 8b)}$$

If the integer M at frequency $f_{m0}$ satisfies Eq.8a or 8b, the unwrapped phase at all other frequency $f_m$ may be expressed as integer numbers of multiples of $2\pi$ in the ideal case or assumed ideal case. In the case where significant noise is present, the unwrapped phase term may be expressed with an integer ($N_{0m}$) and a residual error of the integer $\Delta N_m$, i.e.:

$$N_m = f_m \left(\frac{M}{f_{m0}} + t_{d,m0} - t_{d,m}\right) = (N_{0m} + \Delta N_m).$$

Thus Eq. 8b is now equivalent to:

$$U_M = \Sigma_{\substack{m=1 \\ m \neq m0}} \frac{N_k}{2}[AB_m \cdot [\cos(2\pi \Delta N_m) - 1] = 0. \quad \text{(Eq. 8c)}$$

wherein $2\pi\Delta N_m$ is a small quantity, and thus $\cos(2\pi\Delta N_m)$ $\approx 1 - 0.5 \cdot (2\pi\Delta N_m)^2$. Eq.8c may then be simplified as:

$$U_M = \Sigma_{\substack{m=1 \\ m \neq m0}} \frac{N_k}{2}[AB_m \cdot [-0.5 \cdot (2\pi\Delta N_m)^2] = 0. \quad \text{(Eq. 8d)}$$

Dropping off all the constant parameters yields:

$$U_M = \Sigma_{m \neq m0}^{m-1}[AB_M (\Delta N_m)^2] = 0 \quad \text{(Eq. 8e)}.$$

Eq. 8e may be rewritten to be:

$$U_M = \Sigma_{\substack{m=1 \\ m \neq m0}}\left[\frac{AB_m}{AB_{m0}} \cdot (\Delta N_m)^2\right] = 0, \quad \text{(Eq. 8f)}$$

such that either Eq.8e or Eq.8f can use the instantly measured $AB_m$ or previously measured and averaged ratio of $$\frac{AB_m}{AB_{m0}}$$

which is may be a constant for each sensor element regardless of the signal strength in the ideal case scenario.

The residual integer number $\Delta N_m$ can be expressed as a round operation with the relationship:

$$\Delta N_m = N_m - \text{round}(N_m) = \quad \text{(Eq. 8g)}$$
$$f_m\left(\frac{M}{f_{m0}} + t_{d,m0} - t_{d,m}\right) - \text{round}\left[f_m\left(\frac{M}{f_{m0}} + t_{d,m0} - t_{d,m}\right)\right].$$

As an example, the total integer number counting from 0 to $M_{max}$ is equal to the wrapped $2\pi$ counts within a designed unwrapping distance at the specific frequency $f_{m0}$, for example at the highest frequency used by the system. The unwrapping procedure may be summarized with the following example: the radio wavelength of the highest radio frequency may be determined. For instance, if $f_{m0} = 180$ Mhz the wavelength is 1.6667 m. A value for $M_{max}$ may be determined for the wrapped phase vectors within a determined maximum unwrapping distance. For example, at a designed unwrapping distance of 15 m, $$M_{max} = \frac{2 \times 15}{1.666\ldots} = 18.00072,$$

and may be rounded to an integer 18. M may be set equal to 0, 1, 2 . . . ($M_{max}$-1) e.g., 0, 1, 2 . . . 18, within Eq.6e or 6f to determine which one $M_0$ value minimizes $U_M$. Unwrapped phases for each frequency of modulation light may then be determined based on at least M This yields all unwrapped phase $\Psi_m$ expressed with $M_0$ together with wrapped phase $\varphi_{d,m}$ as:

$$\Psi_m = 2\pi \cdot \text{round}(N_m) + \varphi_{d,m} = \quad \text{(Eq. 9)}$$
$$2\pi \cdot \text{round}\left[f_m\left(\frac{M_0}{f_{m0}} + t_{d,m0} - t_{d,m}\right)\right] + \varphi_{d,m} \text{ for } m = 1, 2, 3.$$

Method 300 and accompanying formulations thus enable the use of multiple frequencies that are not constrained by integral relations with a common denominator among the frequencies, thus generating flexibility that may allow for switchable, adaptable ToF camera systems that remain economical. Method 300 allows a 3D ToF system to use whichever frequency configuration are determined to achieve accurate depth measurements with reduced power consumption within a range of environments. Frequency combinations may be selected based on the unwrapping distance, to improve power efficiency, to reduce noise related to depth jitter, etc. As an example, during a first condition, a scene may be illuminated with a first set of three or more frequencies of modulation light. During a second condition, the scene may be illuminated with a second set of three or more frequencies of modulation light, wherein at least one frequency of the second set is different than any frequency in the first set.

This unwrapping method maps a multiple dimensional phase vector to a scalar with only one unknown integer (M) thus reducing the computational burden when the number of frequencies of modulation light is increased. Further, the system robustness may be auto adapted or weighted by the system active brightness $AB_m$ of the received modulation light. Eq.8 reveals the robust unwrapping result at a Gaussian noise condition above a threshold. Some variations from Eq.6-8f can be modified for example: $U_M = \Sigma_{m \neq m0}^{m-1}$ $[AB_m \cdot \text{abs}(\Delta N_m)] = 0$ (Eq.10).

Eq. 10 is effective for determining unwrapped phases, but is not optimized for a significant Gaussian noise condition. As such, the unwrapping results may not be accurate when the phase noise exceeds a threshold. This can be described as unwrapping failure probability or unwrapping passing rate at noisy condition, which is defined as a ratio of:

$$UR = \left[1 - \frac{\text{Unwrapping failure counts at full unwrapping distance}}{\text{Total unwrapping counts at full designed unwrapping distance}}\right]\% \quad \text{(Eq. 11)}$$

Figure 4:
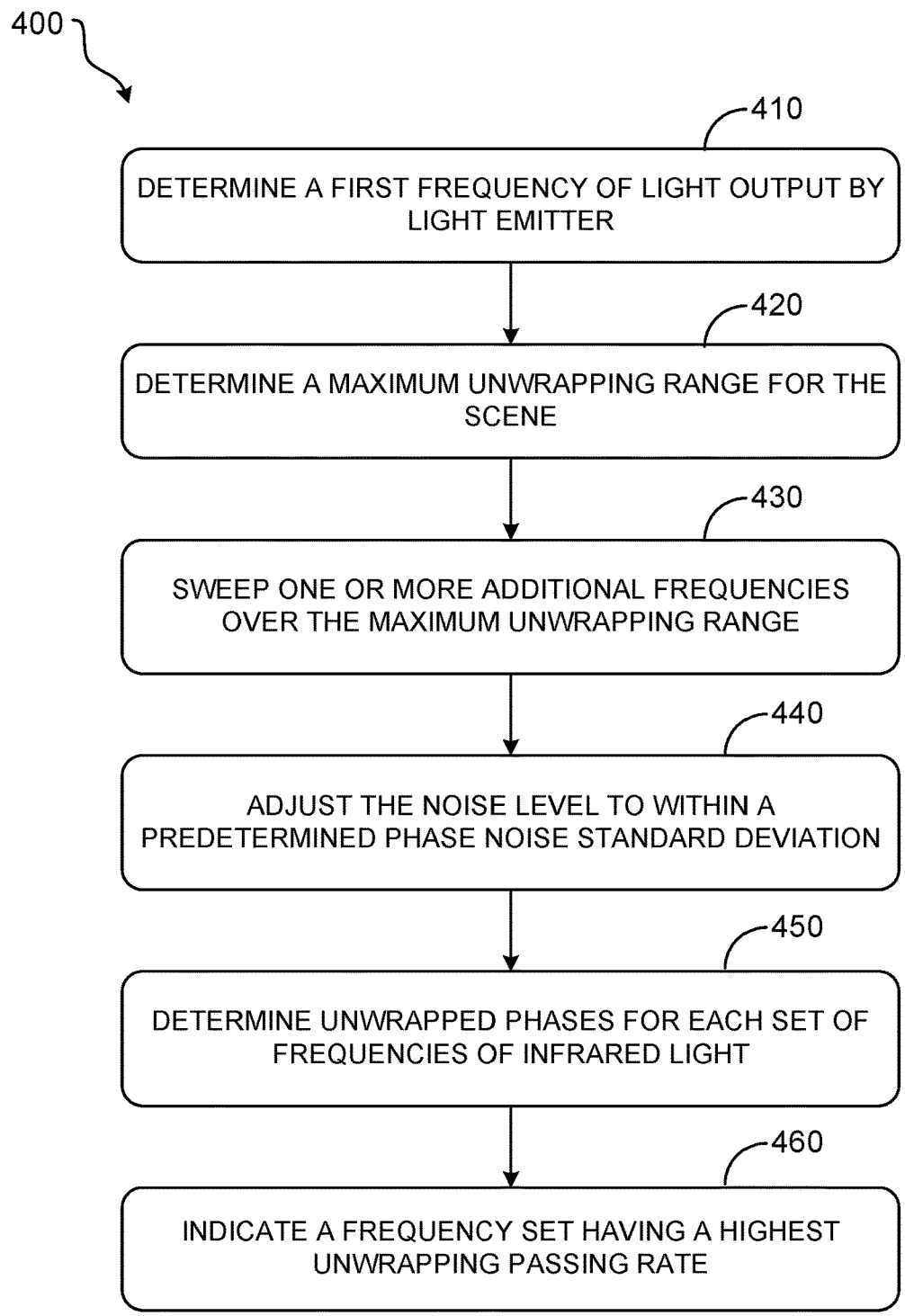
FIG. 4 shows an example method for adjusting phase unwrapping parameters based on a noise condition.

Method 400 of FIG. 4 shows an example method for adjusting phase unwrapping parameters based on a noise condition. As an example, a ToF camera employing a 3-frequency system {f1, f2, f3} is used to describe the robust optimization work for increasing the unwrapping passing rate at a given noisy condition. However, it should be understood that similar methods may be applied to systems using smaller or larger frequency sets.

At 410, method 400 includes determining a first frequency of light that is to be output by the light emitter. As an example, the first frequency of light may be the highest frequency of light output by the light emitter. The first frequency may be arbitrary, predetermined, or based on operating conditions. For example, a highest frequency may be based on a desired depth resolution, and/or a desired range for the other, lower frequencies in the frequency set. As one example, f3 may be set to 198 MHz, but higher or lower frequencies may alternatively be used.

At 420, method 400 includes determining a maximum unwrapping range for the scene to be imaged. The maximum unwrapping range may be empirically determined, estimated, predetermined, or arbitrary, and/or may be based on the determined first (e.g., highest) frequency. As one example, an unwrapping distance L may be set to 16 m, but higher or lower distances may alternatively be used.

At 430, method 400 includes sweeping one or more other frequencies over the maximum unwrapping range. For example, if f3 is determined, a desired range for f1 and f2 may be determined, and ToF measurements taken at an interval resolution for each lower frequency while maintaining the higher frequency constant. As an example, f1 and f2 may be swept over 50-189 MHz for both frequencies, although greater or smaller ranges may be used. The ranges for f1 and f2 need not be identical or even overlapping. The frequency interval resolution may be any suitable value, for example, 1 MHz. In some examples, a lowest of frequencies may be predetermined, and only the middle frequency may be swept. The upper range of usable frequencies may be limited by the product of frequency (f) and the ToF pixel modulation efficiency ME(f), e.g., f·ME(f). However, the range of frequencies swept may include frequencies larger than this upper bound. This may enable later selection of the best frequency settings if characteristics of the device, system, and/or environment are altered in the future.

At 440, method 400 includes adjusting the noise level for each captured image to within a predetermined phase noise standard deviation. Given a noisy perturbation, such as Gaussian noise applied to Eq.3, the noise level may be equalized. For example, the noise level in Eq. 3 representing the capture may be adjusted to bring the phase noise within a standard deviation of 9.5 degrees, though any suitable value may be used. This may yield the noisy simulation result expressed in Eq.5b and 5c at the full unwrapping range L.

At 450, method 400 includes determining unwrapped phases for each of the sets of frequencies of modulation light. For example, unwrapping may be performed in the complex domain based on Eq. 8e and Eq 9. Each result may then be compared to that without accounting for the noise perturbation. Each frequency set may then be assigned a value, for example, using Eq. 9. For example, the value may indicate whether there are more comparative results within 360 degrees of each other (+/− noise), or greater than 360 degrees (+/− noise).

At 460, method 400 includes indicating a frequency set having a highest unwrapping passing rate. As an example, an unwrapping map may be plotted using Eq. 9, wherein UR=RU(f1, f2) at fixed f3 (e.g., 198 MHz).

Figure 5A:
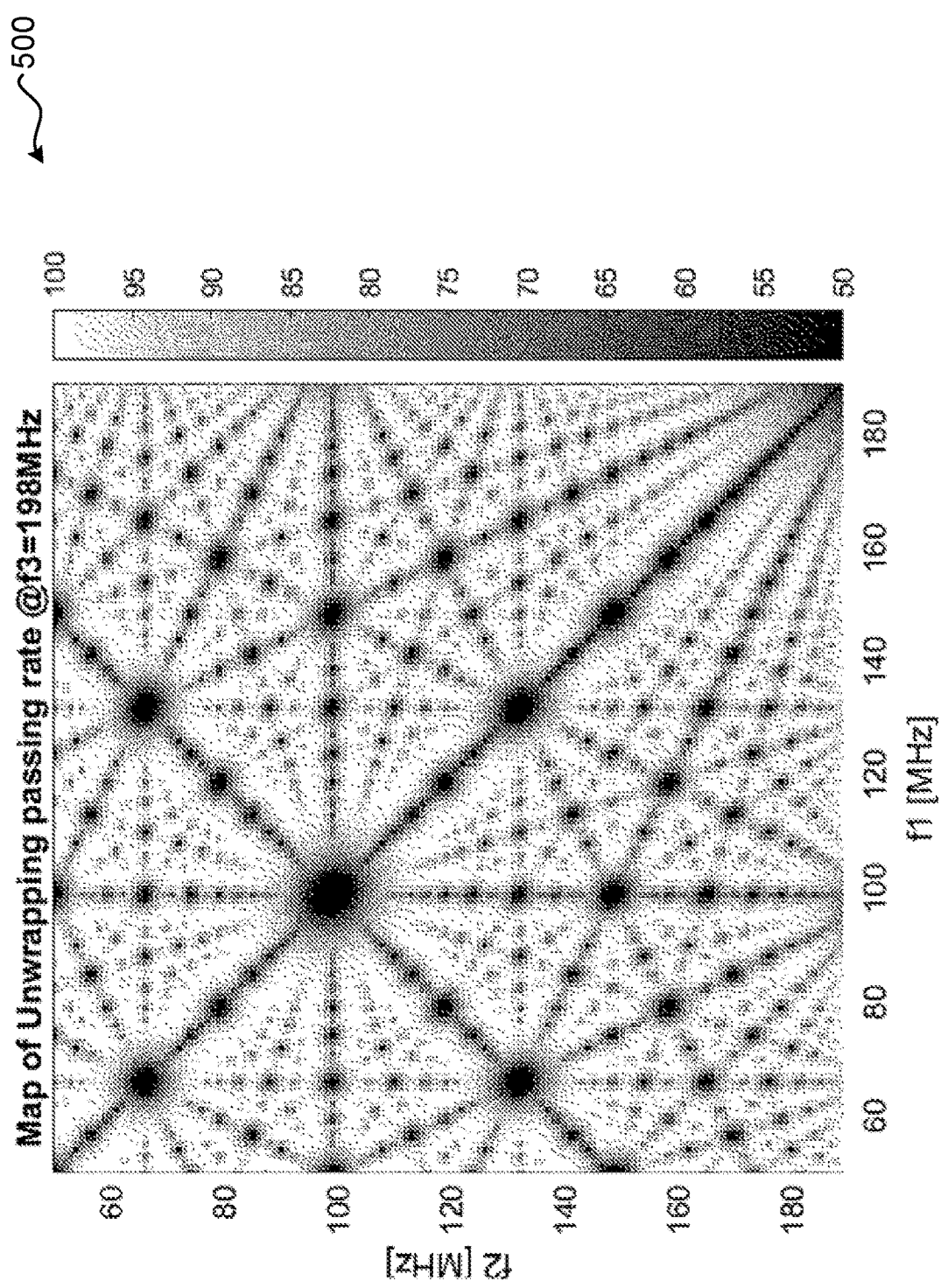
FIG. 5A shows an example map of unwrapping passing rate.

FIG. 5A is a map 500 of unwrapping passing rates at each phase noise standard deviation for a 9.5 degree phase noise condition, scaled from 50-100% as indicated on the right side the map. Visually, this scaling resolution may be too low to determine a desired frequency configuration.

Figure 5B:
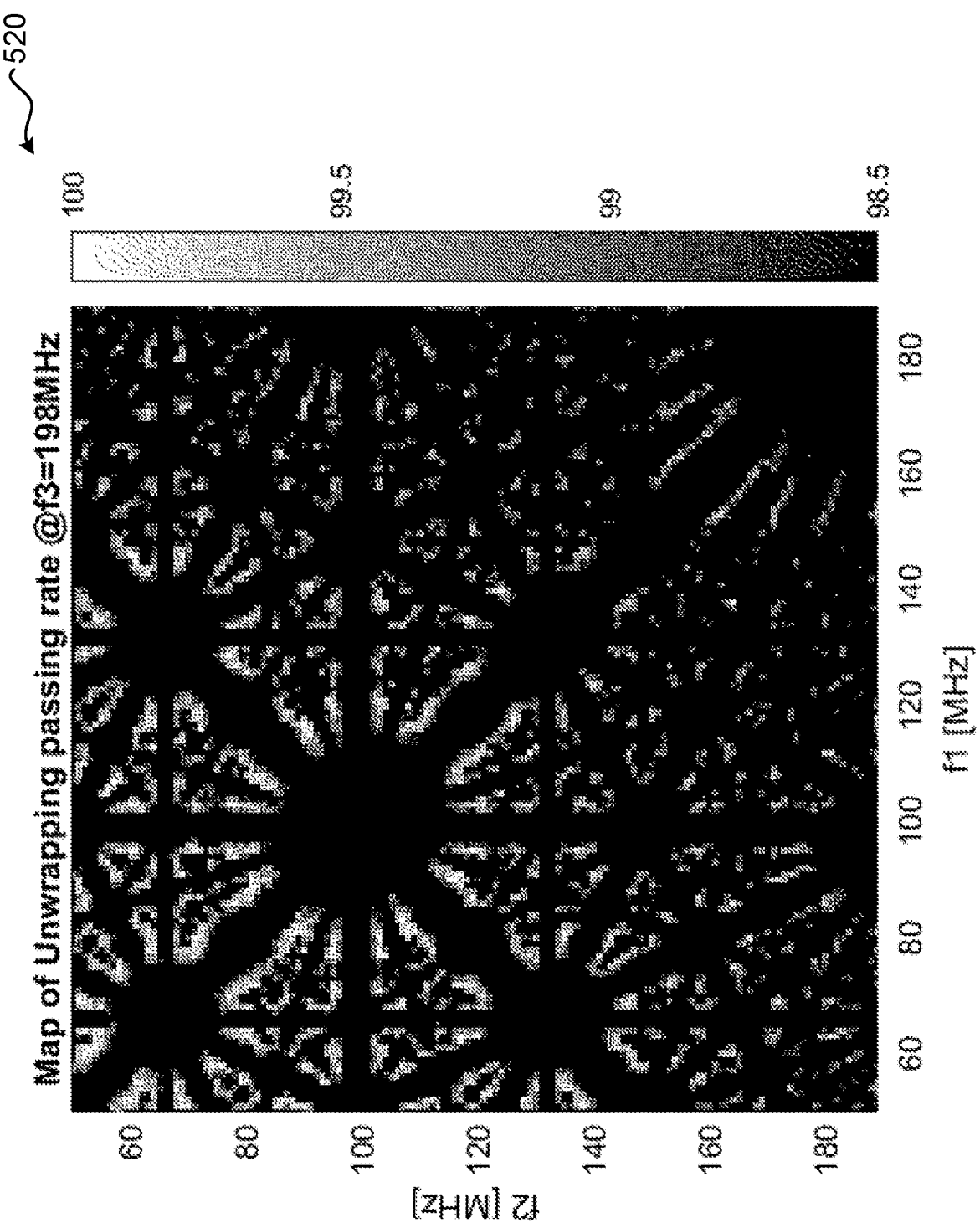
FIG. 5B shows a scaled version of the example map of FIG. 5A.

FIG. 5B shows a map 520 indicating a portion of the unwrapping passing rate map 500 that is scaled from 99-100% for convenience of frequency selection. All the visible points on the map have a higher unwrapping probability or passing rate as described in Eq. 9.

For systems using more than 3 frequencies, optimization of the unwrapping frequencies may by performed by sweeping all the frequencies, iteratively starting from lower numbers of frequencies to higher numbers of frequencies, at given noise conditions with the same procedure mentioned above, though it may not be feasible to visualize the results on a 2D map.

Figure 6A:
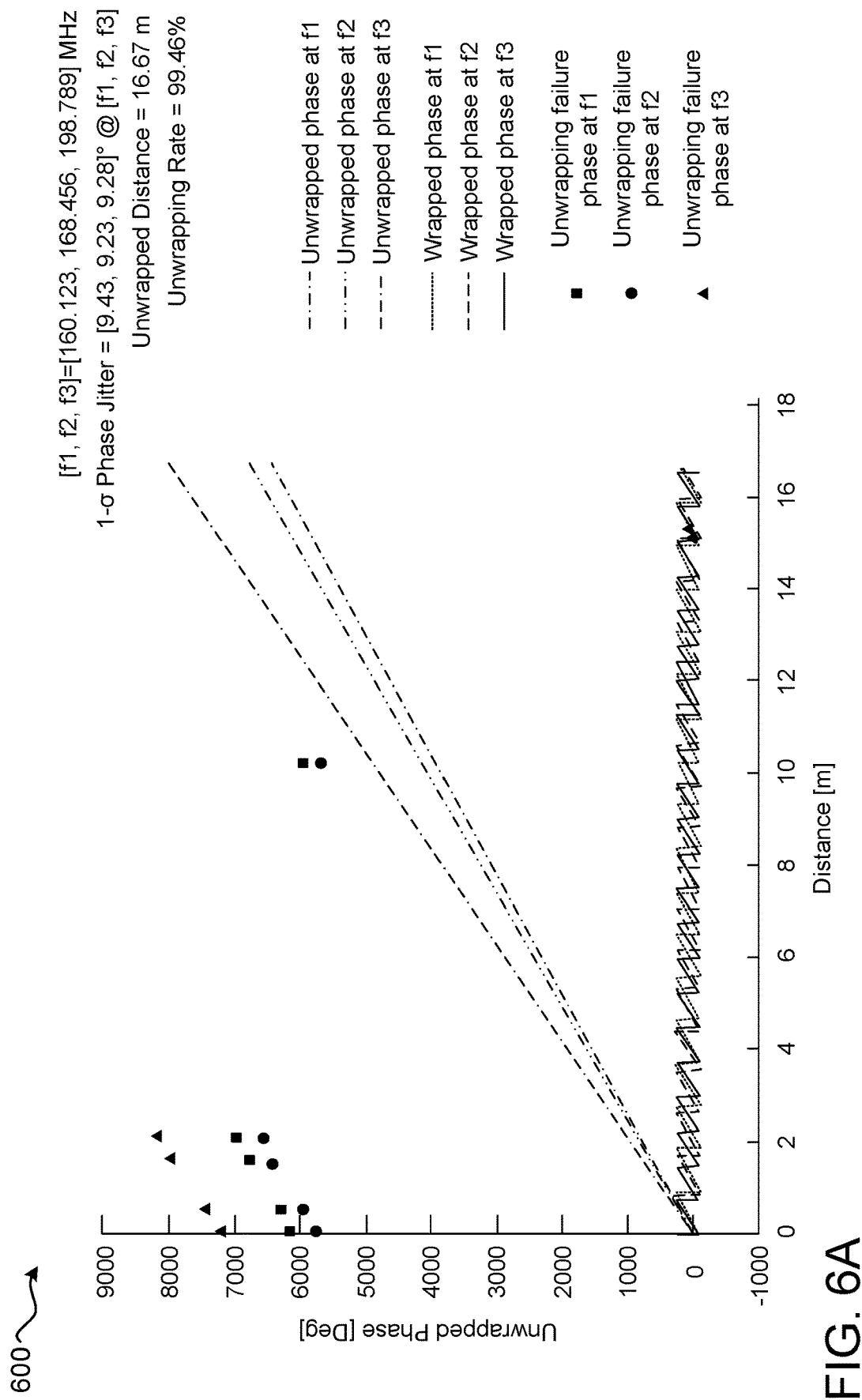
FIG. 6A shows an example plot of phase unwrapping up to a distance of 16.67 m for a noise condition.
Figure 6B:
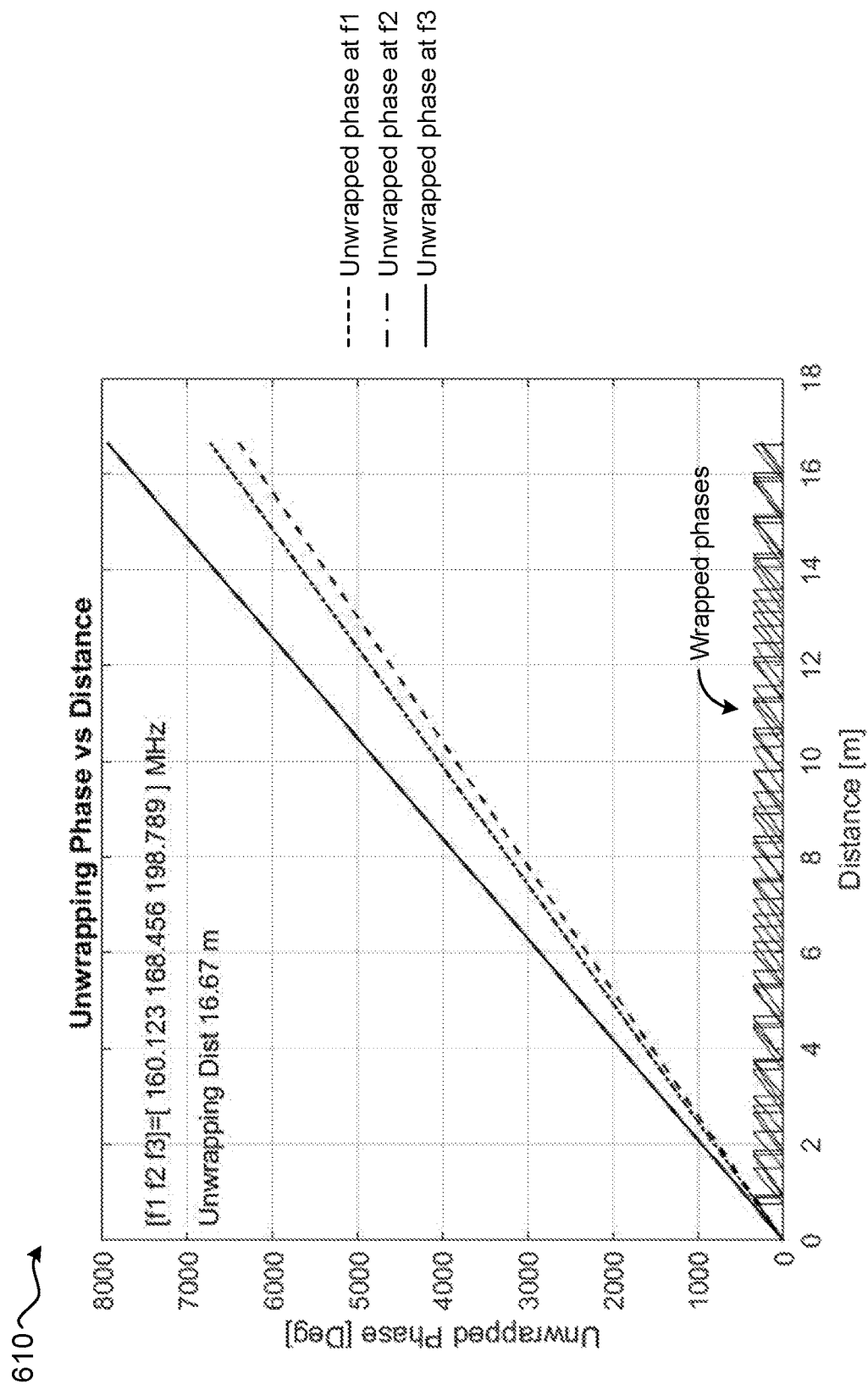
FIG. 6B shows a plot of the example phase unwrapping of FIG. 6A for a zero noise condition.
Figure 6C:
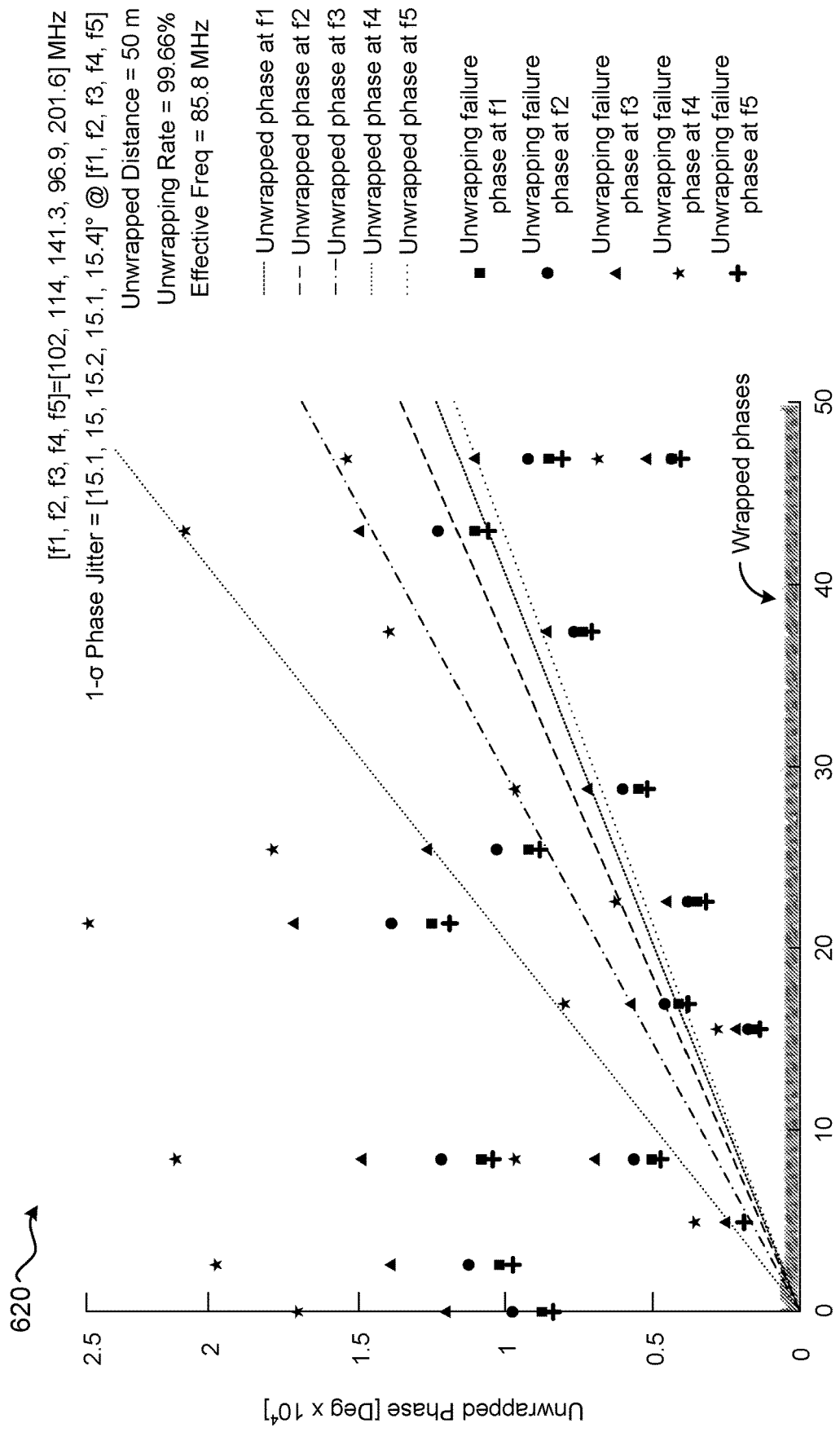
FIG. 6C shows an example plot of phase unwrapping up to a distance of 50 m for a noise condition.

FIG. 6A and FIGS. 6B-6C show two examples that demonstrate unwrapping results for 3-frequency and 5-frequency systems without using rational integer numbers among the frequencies.

FIG. 6A shows a plot 600 indicating an example phase unwrapping result up to an unwrapping distance of 16.67 m with frequencies at f1=160.123 MHz, f2=168.456 MHz, and f3=198.789 MHz. The unwrapping passing rate/probability is about 99.46% at a 1 standard deviation phase noise condition (approx. 9.3 degrees). FIG. 6B shows a plot 610 indicating the example phase unwrapping result of plot 600, but at a zero-noise (ideal) condition.

Figure 6D:
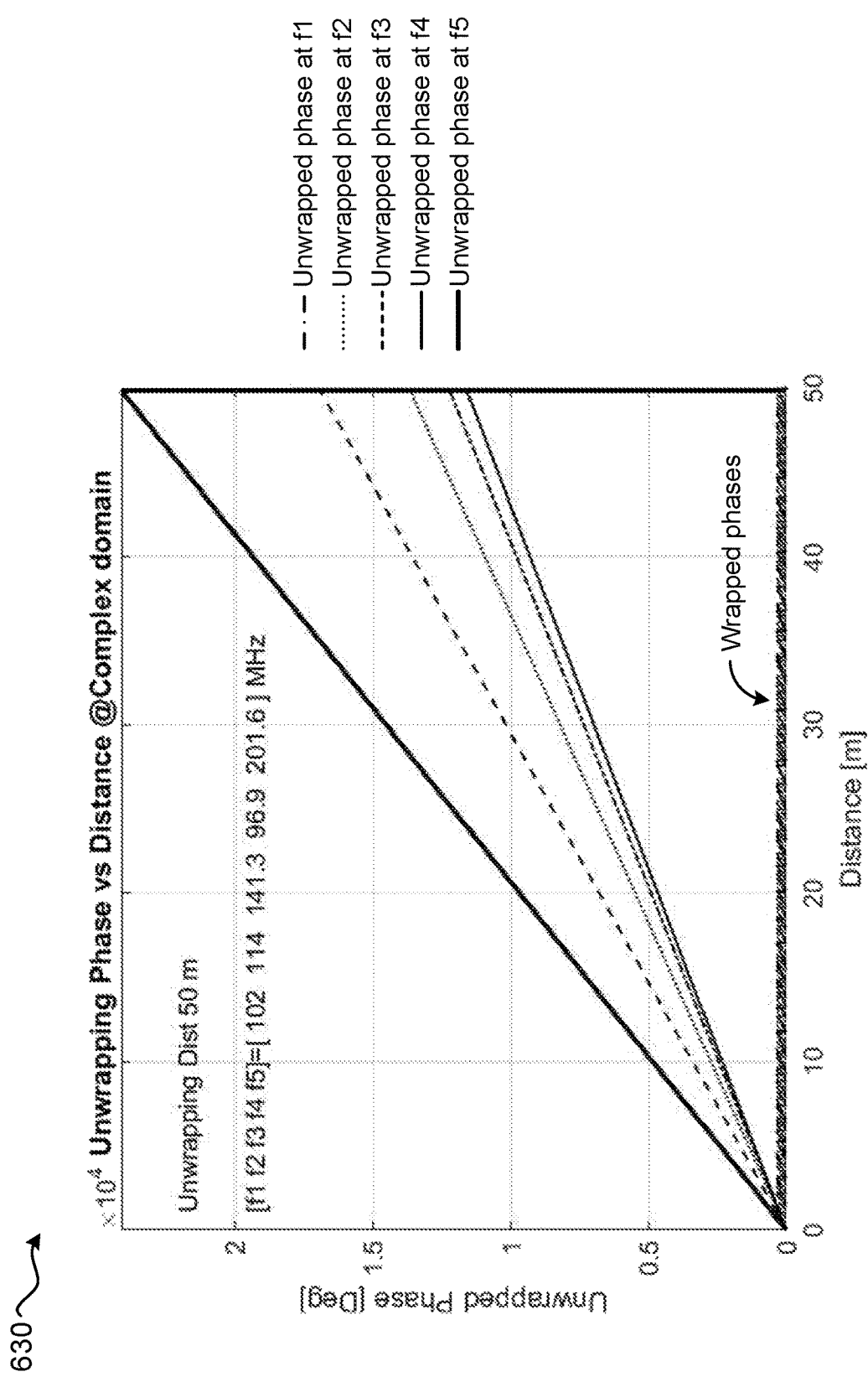
FIG. 6D shows a plot of the example phase unwrapping of FIG. 6C for a zero noise condition.
Figure 6E:
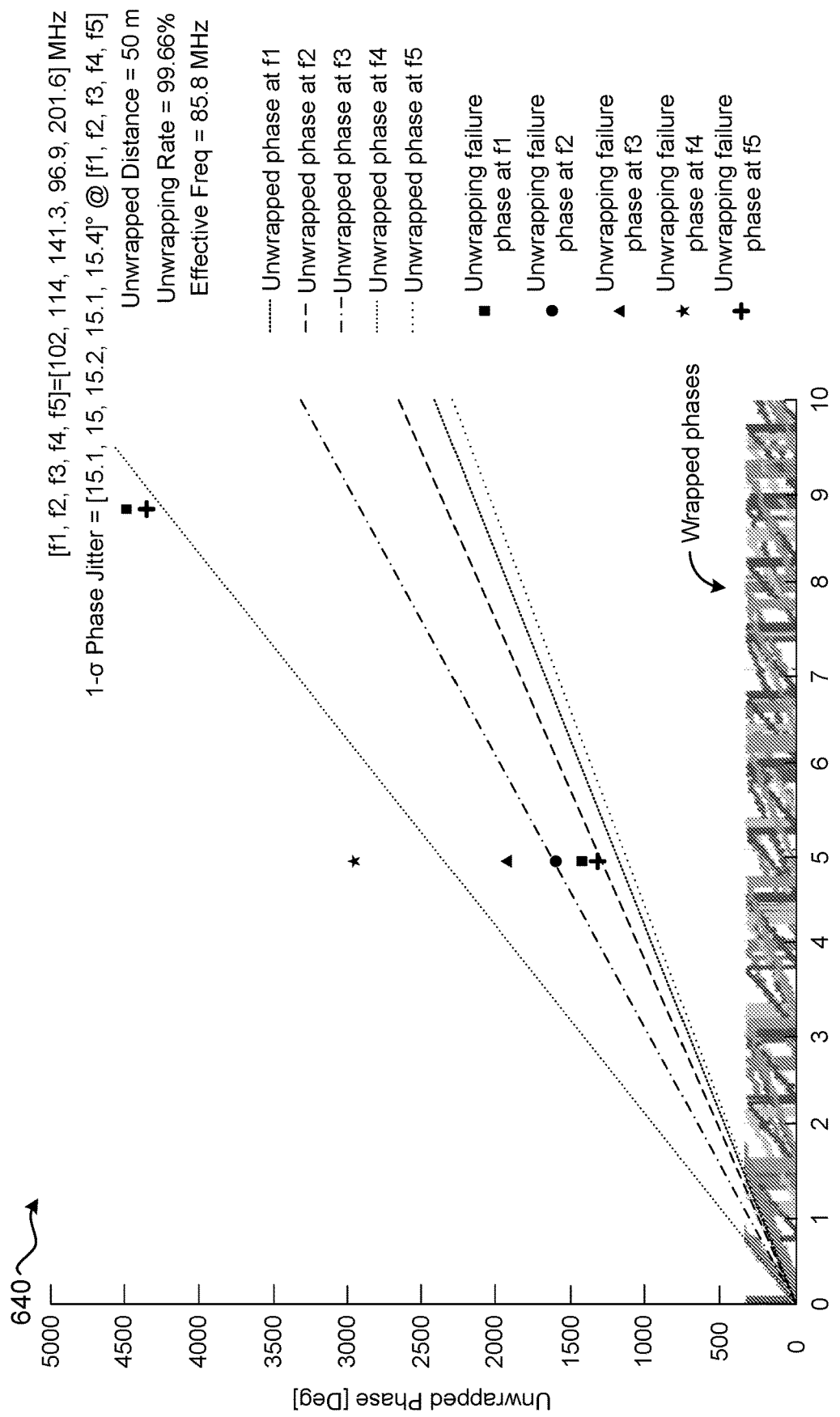
FIG. 6E shows a truncated version of the example plot of FIG. 6C.
Figure 6F:
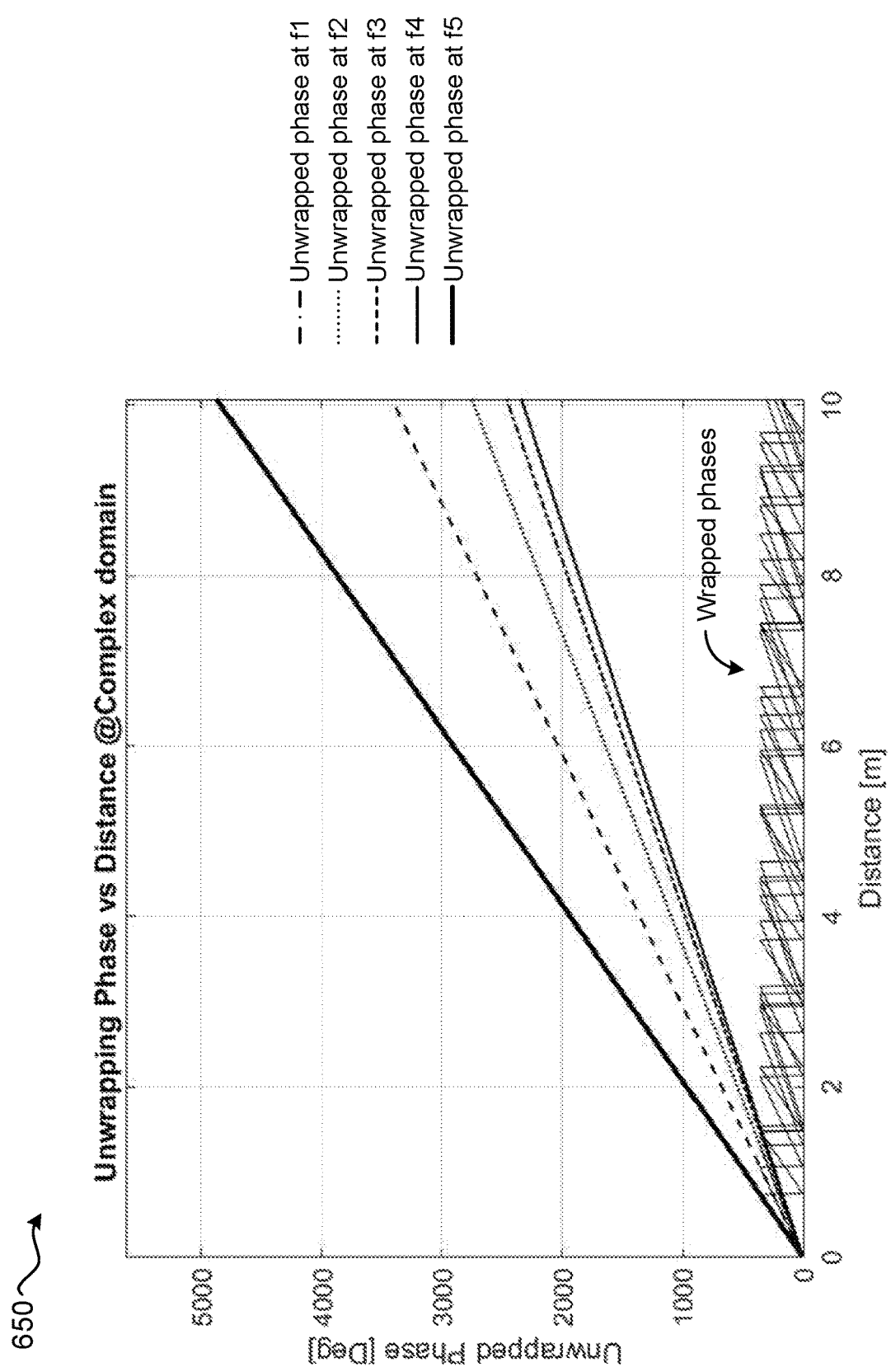
FIG. 6F shows a truncated version of the example plot of FIG. 6D.

FIG. 6C shows a plot 620 indicating an example phase unwrapping result up to an unwrapping distance of 50 m with frequencies at f1=96.9 MHz, f2=102 MHz, f3=114 MHz, and f3=141.3 MHz, f4=201.6. The unwrapping passing rate/probability is about 99.66% at a 1 standard deviation phase noise condition (approx. 15 degrees). Increasing the number of frequencies number makes the unwrapping distanced larger and more robust. FIG. 6D shows a plot 630 indicating the example phase unwrapping result of plot 620, but at a zero noise condition. FIG. 6E shows a plot 640 indicating a close-up portion of plot 620 showing values for distances around 10 m. FIG. 6F shows a plot 650 indicating a close-up portion of plot 630 showing values for distances around 10 m at a zero-noise condition.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
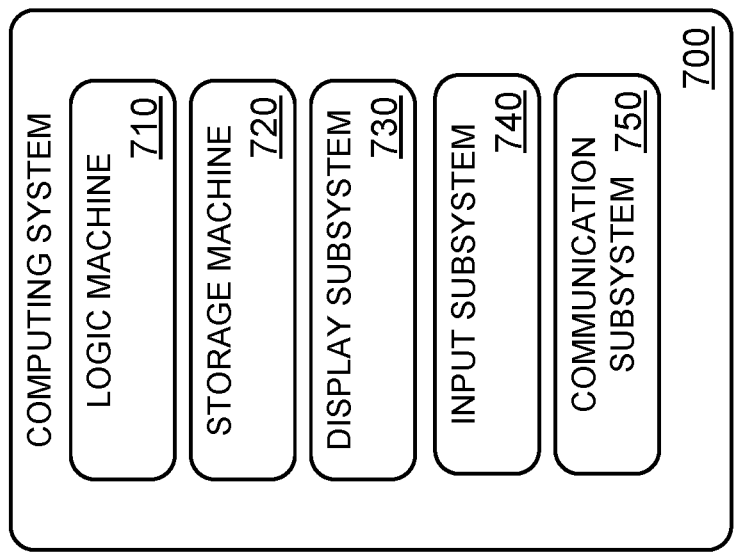
FIG. 7 schematically shows a non-limiting embodiment of a computing system.

FIG. 7 schematically shows a non-limiting embodiment of a computing system 700 that can enact one or more of the methods and processes described above. Computing system 700 is shown in simplified form. Computing system 700 may take the form of one or more personal computers, server computers, tablet computers, home-entertainment computers, network computing devices, gaming devices, mobile computing devices, mobile communication devices (e.g., smart phone), and/or other computing devices. Computing system 700 may be an example of controller 208.

Computing system 700 includes a logic machine 710 and a storage machine 720. Computing system 700 may optionally include a display subsystem 730, input subsystem 740, communication subsystem 750, and/or other components not shown in FIG. 7.

Logic machine 710 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 720 includes one or more physical devices configured to hold instructions executable by the logic machine to implement the methods and processes described herein. When such methods and processes are implemented, the state of storage machine 720 may be transformed—e.g., to hold different data.

Storage machine 720 may include removable and/or built-in devices. Storage machine 720 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 720 may include volatile, nonvolatile, dynamic, static, read/write, read-only, random-access, sequential-access, location-addressable, file-addressable, and/or content-addressable devices.

It will be appreciated that storage machine 720 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 710 and storage machine 720 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 700 implemented to perform a particular function. In some cases, a module, program, or engine may be instantiated via logic machine 710 executing instructions held by storage machine 720. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 730 may be used to present a visual representation of data held by storage machine 720. This visual representation may take the form of a graphical user interface (GUI). As the herein described methods and processes change the data held by the storage machine, and thus transform the state of the storage machine, the state of display subsystem 730 may likewise be transformed to visually represent changes in the underlying data. Display subsystem 730 may include one or more display devices utilizing virtually any type of technology. Such display devices may be combined with logic machine 710 and/or storage machine 720 in a shared enclosure, or such display devices may be peripheral display devices.

When included, input subsystem 740 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 750 may be configured to communicatively couple computing system 700 with one or more other computing devices. Communication subsystem 750 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

In one example, a method for a time-of-flight camera, comprises illuminating a scene with modulation light having two or more frequencies that do not have a common integer denominator; at a sensor array, receiving the modulation light reflected off objects within the scene; and determining unwrapped phases for each of the two or more frequencies of modulation light. In such an example, or any other example, determining unwrapped phases for each of the two or more frequencies of modulation light additionally or alternatively includes: processing the received modulation light to determine wrapped phase vectors for each frequency of modulation light; converting the wrapped phase vectors to phase scalars in a complex domain; and determining unwrapped phases in the complex domain based on the phase scalars. In any of the preceding examples, or any other example, the phase scalars are additionally or alternatively expressed with a single unknown integer M, wherein M is a wrapped period number of a $2\pi$ module for a given frequency of modulation light. In any of the preceding examples, or any other example, the method additionally or alternatively comprises determining a value for $M_{max}$ for the wrapped phase vectors within a determined maximum unwrapping distance; and determining a value for M based on a value that minimizes the value of $U_M$, such that $0 \leq M \leq M_{max}$, wherein $$U_M = \Sigma_m \frac{N_k}{2} \left[ AB_m \cdot \left[ \cos\left(2\pi f_m \left(\frac{M}{f_{m0}} + t_{d,m0} - t_{d,m}\right)\right) - 1 \right] \right] = 0,$$

and wherein $N_k$ is a total phase shifting steps at each frequency, $AB_m$ is an active brightness at each frequency $f_m$ and $t_{d,m}$ is a wrapped time-of-flight at each frequency $f_m$. In any of the preceding examples, or any other example, unwrapped phases for a frequency of modulation light are additionally or alternatively determined based on at least M. In any of the preceding examples, or any other example, Gaussian noise is additionally or alternatively filtered from the phase vectors using a numeric filter in the complex domain. In any of the preceding examples, or any other example, a system robustness is additionally or alternatively weighted based on an active brightness of the received modulation light.

In another example, a time-of-flight camera comprises a modulated light emitter configured to illuminate a scene with modulation light having two or more frequencies that do not have a common integer denominator; a sensor array configured to receive the modulation light reflected off objects within the scene; a controller configured to: process the received modulation light to determine wrapped phase vectors for each frequency of modulation light; and determine unwrapped phases for each of the two or more frequencies of modulation light. In such an example, or any other example, the controller is additionally or alternatively configured to: convert the wrapped phase vectors to phase scalars in a complex domain; and determine unwrapped phases in the complex domain based on the phase scalars. In any of the preceding examples, or any other example, the phase scalars are additionally or alternatively expressed with a single unknown integer M, wherein M is a wrapped period number of a $2\pi$ module for a given frequency of modulation light. In any of the preceding examples, or any other example, the controller is additionally or alternatively configured to determine a value for $M_{max}$ for the wrapped phase vectors within a determined maximum unwrapping distance; and determine a value for M based on a value that minimizes the value of such that $0 \leq M \leq M_{max}$, wherein $$U_M = \Sigma_m \frac{N_k}{2}\left[AB_m \cdot \left[\cos\left(2\pi f_m\left(\frac{M}{f_{m0}} + t_{d,m0} - t_{d,m}\right)\right) - 1\right]\right] = 0,$$

and wherein $N_k$ is a total phase shifting steps at each frequency, $AB_m$ is an active brightness at each frequency $f_m$ and $t_{d,m}$ is a wrapped time-of-flight at each frequency $f_m$. In any of the preceding examples, or any other example, unwrapped phases for a frequency of modulation light are additionally or alternatively determined based on at least the value of M that generates an extremum for the value of $U_M$. In any of the preceding examples, or any other example, the controller is additionally or alternatively configured to: filter Gaussian noise from the phase vectors using a numeric filter in the complex domain. In any of the preceding examples, or any other example, the controller is additionally or alternatively configured to: weight a system robustness based on an active brightness of the received modulation light.

In yet another example, a method for a time-of-flight camera, comprises illuminating a scene with three or more frequencies of modulation light; at a sensor array, receiving the modulation light reflected off objects within the scene; processing the received modulation light to determine wrapped phase vectors for each frequency of modulation light; converting the phase vectors to phase scalars in a complex domain; and determining unwrapped phase in the complex domain based on the phase scalars. In such an example, or any other example, the phase scalars are additionally or alternatively expressed with a single unknown integer M, wherein M is a wrapped period number of a $2\pi$ module for a given frequency of modulation light. In any of the preceding examples, or any other example, converting the phase vectors to phase scalars in a complex domain additionally or alternatively includes generating an unwrapping formulation constrained by complex values $R(m)=\Sigma_k[V_{m,k} \cos(\psi_k)]$ and $I(m)=\Sigma_k[V_{m,k} \sin(\psi_k)]$, unitarily in the complex domain $$U_M = \Sigma_m\left[R(m) \cdot \cos(2\pi f_m T_d) - I(m) \cdot \sin(2\pi f_m T_d) - \frac{N_k}{2}AB_m\right] = 0.$$

In any of the preceding examples, or any other example, the method additionally or alternatively comprises determining a value for M based on minimization of $U_M$, such that $0 \leq M \leq M_{max}$, where $$U_M = \Sigma_m \frac{N_k}{2}\left[AB_m \cdot \left[\cos\left(2\pi f_m\left(\frac{M}{f_{m0}} + t_{d,m0} - t_{d,m}\right)\right) - 1\right]\right] = 0.$$

In any of the preceding examples, or any other example, the method additionally or alternatively comprises during a first condition, illuminating the scene with a first set of three or more frequencies of modulation light; and during a second condition, illuminating the scene with a second set of three or more frequencies of modulation light, wherein at least one frequency of the second set is different than any frequency in the first set. In any of the preceding examples, or any other example, the three of more frequencies of modulation light are additionally or alternatively selected based on an optimization process comprising: determining a first emitted frequency of modulation light; determining a maximum unwrapping range for the scene; sweeping one or more additional frequencies of the three or more frequencies of modulation light over the maximum unwrapping range; adjusting a noise level for received modulation light to within a predetermined phase noise standard deviation; determining unwrapped phases for each set of frequencies of modulation light; and indicating a frequency set having a highest unwrapping passing rate.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for a time-of-flight camera, comprising:
    illuminating a scene with modulation light having two or more frequencies that do not have a common integer denominator;
    at a sensor array, receiving the modulation light reflected off objects within the scene; and
    determining unwrapped phases for each of the two or more frequencies of modulation light by at least:
        processing the received modulation light to determine wrapped phase vectors for each frequency of modulation light;
        converting the wrapped phase vectors to phase scalars in a complex domain; and
        determining unwrapped phases in the complex domain based on the phase scalars.

2. The method of claim 1, wherein the phase scalars are expressed with a single unknown integer M, wherein M is a wrapped period number of a $2\pi$ module for a given frequency of modulation light.

3. The method of claim 2, further comprising:
determining a value for $M_{max}$ for the wrapped phase vectors within a determined maximum unwrapping distance; and
determining a value for M based on a value that minimizes a value of $U_M$, such that $0 \leq M \leq M_{max}$, wherein $$U_M = \Sigma_m \frac{N_k}{2} \left[ AB_m \cdot \left[ \cos\left(2\pi f_m\left(\frac{M}{f_{m0}} + t_{d,m0} - t_{d,m}\right)\right) - 1 \right] \right] = 0,$$

and wherein $N_k$ is a total phase shifting steps at each frequency, $AB_m$ is an active brightness at each frequency $f_m$ and $t_{d,m}$ is a wrapped time-of-flight at each frequency $f_m$.

4. The method of claim 3, wherein unwrapped phases for a frequency of modulation light are determined based on at least M.

5. The method of claim 1, wherein Gaussian noise is filtered from the phase vectors using a numeric filter in the complex domain.

6. The method of claim 1, wherein a system robustness is weighted based on an active brightness of the received modulation light.

7. A time-of-flight camera, comprising:
a modulated light emitter configured to illuminate a scene with modulation light having two or more frequencies that do not have a common integer denominator;
a sensor array configured to receive the modulation light reflected off objects within the scene;
a controller configured to:
process the received modulation light to determine wrapped phase vectors for each frequency of modulation light; and
determine unwrapped phases for each of the two or more frequencies of modulation light by at least
converting the wrapped phase vectors to phase scalars in a complex domain; and
determining unwrapped phases in the complex domain based on the phase scalars.

8. The time-of-flight camera of claim 7, wherein the phase scalars are expressed with a single unknown integer M, wherein M is a wrapped period number of a $2\pi$ module for a given frequency of modulation light.

9. The time-of-flight camera of claim 8, wherein the controller is further configured to:
determine a value for $M_{max}$ for the wrapped phase vectors within a determined maximum unwrapping distance; and
determine a value for M based on a value that generates an extremum for a value of $U_M$ such that $0 \leq M \leq M_{max}$, wherein $$U_M = \sum_m \frac{N_k}{2} \left[ AB_m \cdot \left[ \cos\left(2\pi f_m\left(\frac{M}{f_{m0}} + t_{d,m0} - t_{d,m}\right)\right) - 1 \right] \right] = 0,$$

and wherein $N_k$ is a total phase shifting steps at each frequency, $AB_m$ is an active brightness at each frequency $f_m$ and $t_{d,m}$ is a wrapped time-of-flight at each frequency $f_m$.

10. The time-of-flight camera of claim 9, wherein unwrapped phases for a frequency of modulation light are determined based on at least the value of M that generates an extremum for the value of $U_M$.

11. The time-of-flight camera of claim 7, wherein the controller is further configured to:
filter Gaussian noise from the phase vectors using a numeric filter in the complex domain.

12. The time-of-flight camera of claim 7, wherein the controller is further configured to:
weight a system robustness based on an active brightness of the received modulation light.

13. A method for a time-of-flight camera, comprising:
illuminating a scene with three or more frequencies of modulation light;
at a sensor array, receiving the modulation light reflected off objects within the scene;
processing the received modulation light to determine wrapped phase vectors for each frequency of modulation light;
converting the phase vectors to phase scalars in a complex domain; and
determining unwrapped phase in the complex domain based on the phase scalars.

14. The method of claim 13, wherein the phase scalars are expressed with a single unknown integer M, wherein M is a wrapped period number of a $2\pi$ module for a given frequency of modulation light.

15. The method of claim 14, wherein converting the phase vectors to phase scalars in a complex domain includes generating an unwrapping formulation constrained by complex values $R(m) = \Sigma_k[V_{m,k} \cos(\psi_k)]$ and $I(m) = \Sigma_k[V_{m,k} \sin(\psi_k)]$, unitarily in the complex domain:

$$U_M = \sum_m \left[ R(m) \cdot \cos(2\pi f_m T_d) - I(m) \cdot \sin(2\pi f_m T_d) - \frac{N_k}{2} AB_m \right] = 0.$$

16. The method of claim 14, further comprising:
determining a value for M based on minimization of $U_M$, such that $0 \leq M \leq M_{max}$, wherein $$U_M = \sum_m \frac{N_k}{2} \left[ AB_m \cdot \left[ \cos\left(2\pi f_m\left(\frac{M}{f_{m0}} + t_{d,m0} - t_{d,m}\right)\right) - 1 \right] \right] = 0.$$

17. The method of claim 13, further comprising:
during a first condition, illuminating the scene with a first set of three or more frequencies of modulation light; and
during a second condition, illuminating the scene with a second set of three or more frequencies of modulation light, wherein at least one frequency of the second set is different than any frequency in the first set.

18. The method of claim 13, wherein the three of more frequencies of modulation light are selected based on an optimization process comprising:
determining a first emitted frequency of modulation light;
determining a maximum unwrapping range for the scene;
sweeping one or more additional frequencies of the three or more frequencies of modulation light over the maximum unwrapping range;
adjusting a noise level for received modulation light to within a predetermined phase noise standard deviation;
determining unwrapped phases for each set of frequencies of modulation light; and
indicating a frequency set having a highest unwrapping passing rate.

* * * * *